US006433669B1

(12) United States Patent
Kuramatsu

(10) Patent No.: US 6,433,669 B1
(45) Date of Patent: Aug. 13, 2002

(54) RADIO PAGING RECEIVER WITH AN ERROR INDICATING FUNCTION IN WHICH ERROR INDICATION DATA TO OVERWRITE FAULTY MESSAGE DATA CAN BE ALTERED

(75) Inventor: Hiroyasu Kuramatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/300,442

(22) Filed: Apr. 28, 1999

(30) Foreign Application Priority Data

Apr. 28, 1998 (JP) .......................................... 10-118788

(51) Int. Cl.[7] .............................................. H04Q 7/00

(52) U.S. Cl. ...................... 340/7.44; 340/7.2; 340/7.33; 340/7.34; 340/7.35; 340/7.55; 455/343; 455/522; 714/703; 714/704; 714/746

(58) Field of Search .............................. 340/7.44, 7.33, 340/7.34, 7.35, 7.2, 7.55; 455/343, 522; 714/704, 703, 746, 768, 764

(56) References Cited

U.S. PATENT DOCUMENTS 5,386,589 A * 1/1995 Kanai ......................... 455/423
5,396,660 A 3/1995 Cannon
5,841,782 A 11/1998 Mock et al.
6,259,928 B1 * 7/2001 Vembu ....................... 455/522

FOREIGN PATENT DOCUMENTS

JP 64-48949 3/1989
JP 6-204937 7/1994

* cited by examiner

*Primary Examiner*—Brian Zimmerman
*Assistant Examiner*—Yves Dalencourt
(74) *Attorney, Agent, or Firm*—Sughrue Mion, PLLC

(57) ABSTRACT

A radio paging receiver including a data memory (1) for memorizing message data and error indication data to overwrite the message data, a control unit (2) for overwriting the message data with the error indication data when the message data contains an error and transmitting for message display the message data overwritten with the error indication data, a display unit (5) for displaying the message data (including the error indication data in presence of the error), a code programmer (4) for setting a program for entering the error indication data in correspondence to code identification in response to an indication request, and an error identification memory (3) for rewritably memorizing the error indication data in correspondence to the code identification.

7 Claims, 7 Drawing Sheets

RADIO PAGING RECEIVER WITH AN ERROR INDICATING FUNCTION IN WHICH ERROR INDICATION DATA TO OVERWRITE FAULTY MESSAGE DATA CAN BE ALTERED

BACKGROUND OF THE INVENTION

This invention relates to a radio paging receiver and, in particular, to a radio paging receiver with an error indicating function of overwriting faulty message data with error indication data when a message is displayed during a radio calling operation.

An existing radio paging receiver of the type memorizes message data and error indication data to overwrite the message data. In accordance with a predetermined program, the message data are read and judged for presence or absence of an error. In presence of the error, the error indication data are read to overwrite the message data before the message data are delivered. Then, the message data with or without the error indication data are displayed.

The radio paging receiver mentioned above receives an external radio communication signal containing the message data addressed to the receiver and demodulates the radio communication signal into a digital signal. The digital signal is analyzed into word data to detect an address destined to the receiver and to acquire the message data following the address. The above-mentioned analysis is carried out by establishing bit synchronization using a preamble of the digital signal and by establishing word synchronization by detecting a synchronization signal contained in the digital signal.

There are various previous techniques related to the radio paging receiver having such error indicating function. For example, Japanese Unexamined Utility Model Publication (JP-U) No. 64-48949 (48949/1989) discloses a radio paging receiver with a display function, in which error symbol indicators are provided below a message display zone in one-to-one correspondence to message characters and, if an error is present in received message data, one of the error symbol indicators corresponding to an error character is lightened. Japanese Unexamined Patent Publication (JP-A) No. 6-204937 (204937/1994) discloses a radio paging receiver in which, upon occurrence of an error in a received message or upon failure in message reception, an error content and contact address information are explicitly displayed.

In each of the existing radio paging receivers mentioned above, such error indicating operation upon message display is carried out as specified by a predetermined program. Therefore, the content of error indication can neither be changed nor diversified.

Specifically, necessity of the error indication upon message display is caused by various reasons, for example, due to system sensitivity or sender's mistake in message entry. On the side of a recipient or a possessor of the receiver, it is impossible to identify a specific reason. Therefore, a single kind of error indication is used in the existing radio paging receivers for the purpose of simply informing the recipient that the presence of the error is indicated.

Such a single kind of error indication is unfavorable because the receiver is used in various situations. For example, when the recipient recognizes that the error is susceptible to occur because of positional relationship between a paging system and the receiver, error indication is too conspicuous (a narrow reception area is exposed). In this event, it is desired to perform the error indication in a moderate or less conspicuous manner. On the contrary, if message display is very important for the recipient, the error indication is also significant. In this case, it is desired to perform the error indication in a more conspicuous manner. Thus, the content of the error indication is desired to be altered or diversified.

If the paging system supports multiple languages, the following problems will arise. For example, Hindi and Arabic languages contain many characters with horizontal lines. In fact, the error indication by the use of underlines or double canceling lines are effective in English characters, Japanese kanji characters, Chinese kanji characters, and so on. However, with respect to Hindi and Arabic languages of the above-mentioned nature, it is difficult to judge whether a particular character with an underline or a double canceling line is a normal character or a faulty character with error indication. Under the circumstances, it is desired to realize the function of performing variable error indication adapted to different natures of the multiple languages.

However, in the existing radio paging receiver with the function of performing a single kind of error indication as described above, the content of the error indication can not be altered even if it is desired in correspondence to the degree of significance of error indication or in order to optimize the error indication depending upon the nature of the language. Thus, the demand for a variety of error indication can not be met.

SUMMARY OF THE INVENTION

It is a technical object of this invention to provide a radio paging receiver which enables error indication to be easily altered and therefore diversified so as to assist a user in handling.

According to this invention, there is provided a radio paging receiver comprising a data memorizing section for memorizing message data and error indication data to overwrite the message data, a control section for detecting presence or absence of an error in the message data, overwriting the message data with the error indication data in presence of the error, and transmitting for message display the message data alone or the message data overwritten with the error indication data, a display section for displaying the message data alone or the message data overwritten with the error indication data, a code program setting section for setting a program for entering the error indication data in correspondence to code identification in response to an indication request, and an error identification memorizing section for rewritably memorizing the error indication data in correspondence to the code identification. The control section makes the error identification memorizing section preliminarily store the error indication data in correspondence to an ID code for the code identification specified by the program.

In the above-mentioned radio paging receiver, the control section makes the error identification memorizing section store the error indication data in a manner such that different contents are stored at different addresses, respectively.

In the above-mentioned radio paging receiver, the control section reads, when a power supply is turned on, the error indication data from the error identification memorizing section and makes the data memorizing section memorize the error indication data.

In the above-mentioned radio paging receiver, the data memorizing section comprises a message data memory for memorizing the message data for use in error detection, and an error indication data memory for rewritably memorizing the error indication data. The control section reads the message data from the message data memory upon message display and, in presence of the error as a result of error detection of the message data, reads the error indication data from the error indication data memory to overwrite the message data before transmission of the message data for message display.

In the above-mentioned radio paging receiver, the control section reads, when a power supply is turned on, the error indication data from the error identification memorizing section and makes the error indication data memory memorize the error indication data.

The above-mentioned radio paging receiver further comprises a radio receiving section for receiving an external radio communication signal including the message data addressed to the receiver to demodulate the radio communication signal into a digital signal, and a decoder for analyzing the digital signal into word data to detect an address destined to the receiver and delivering to the control section the address thus detected and the message data following the address.

In the above-mentioned radio paging receiver, the decoder analyzes the word data by establishing bit synchronization using a preamble of the digital signal and by establishing word synchronization by detecting a synchronization signal contained in the digital signal. The control section makes the error indication data memory memorize the address destined to the receiver.

DESCRIPTION OF THE PREFERRED EMBODIMENT

Figure 1:
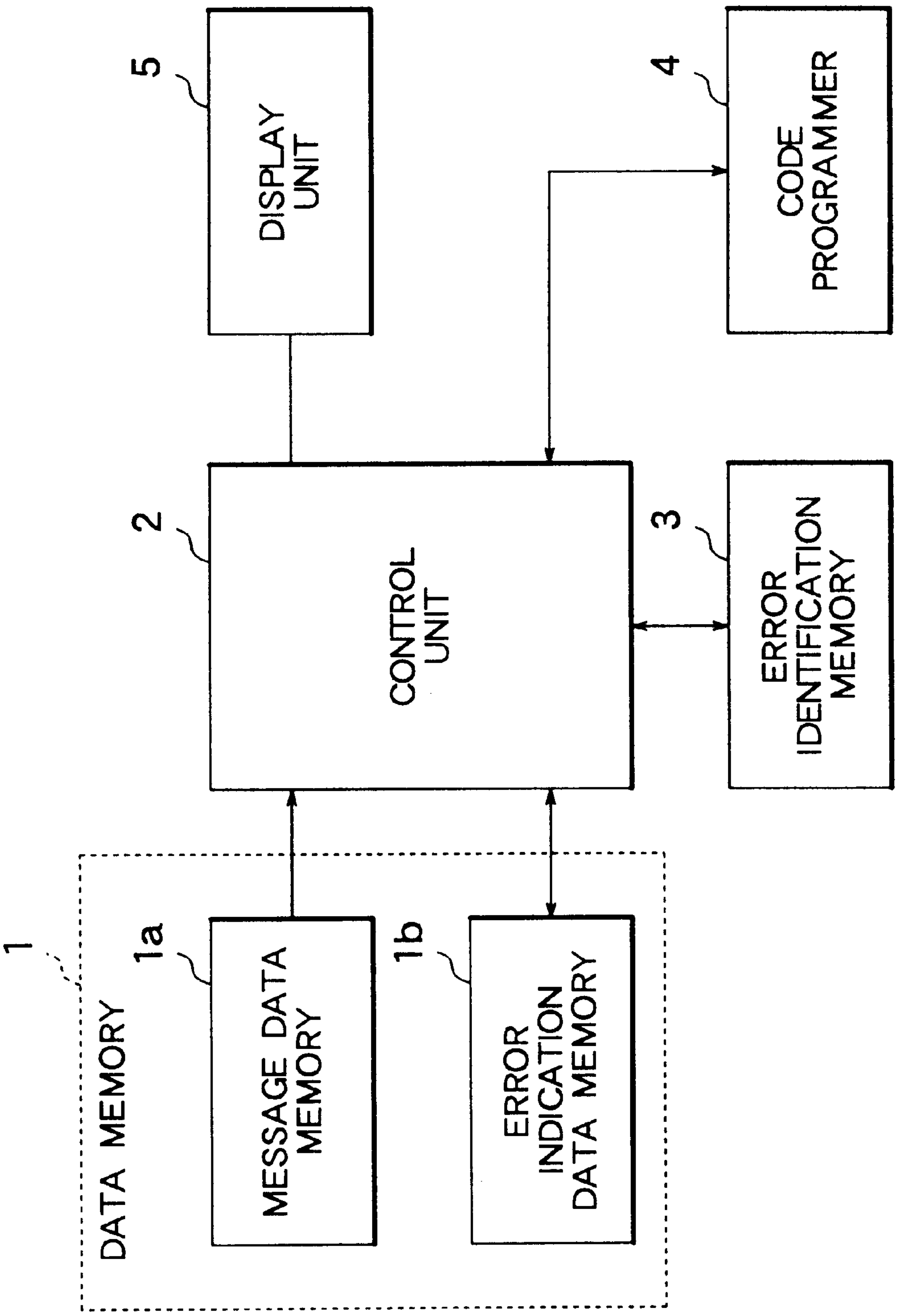
FIG. 1 is a block diagram of a characteristic part of a radio paging receiver according to one embodiment of this invention.

For a better understanding of this invention, description will at first be made about an existing radio paging receiver.

In order to achieve an error indicating function of overwriting faulty message data with error indication data when a message is displayed during a radio paging operation, the existing radio paging receiver comprises a data memory for memorizing message data and error indication data to overwrite the message data, a control unit operable in accordance with a predetermined program for reading the message data from the data memory and for reading, if an error is detected as a result of error detection of the message data, the error indication data from the data memory to overwrite the message data before the message data are transmitted, a display unit for displaying the message data alone or the message data overwritten with the error indication data, a radio receiving unit for receiving an external radio communication signal including the message data addressed to the receiver to demodulate the radio communication signal into the digital signal, and a decoder for analyzing the digital signal into word data to detect an address destined to the receiver and delivering to the control unit the address thus detected and the message data following the address.

The decoder analyzes the word data by establishing bit synchronization using a preamble of the digital signal and by establishing word synchronization by detecting a synchronization contained in the digital signal.

In the above-mentioned radio paging receiver, the radio receiving unit receives the external radio communication signal including the message data addressed to the received and demodulates the radio communication signal into the digital signal. The decoder analyzes the digital signal into the word data to detect the address destined to the receiver and delivers to the control unit the address thus detected. The control unit reads the message data preliminarily memorized in the data memory for use in error detection and compares the message data thus read and the message data contained in the digital signal. In presence of an error, the control section reads from the data memory the error indication data at a corresponding address and overwrites the message data with the error indication data. The control section delivers to the display unit the message data overwritten with the error indication data. The display unit displays the message data overwritten with the error indication data.

In the above-mentioned radio paging receiver, such error indicating operation upon message display is carried out as specified by a predetermined program. The radio paging receiver has the error indicating function of performing a single kind of error indication for the purpose of simply informing a possessor of the receiver that the presence of the error is indicated. Thus, it is impossible to change or diversify the content of error indication. Thus, in a paging system supporting multiple languages, it is impossible to optimize the manner of error indication in correspondence to each of the multiple languages.

Now referring to FIG. 1, description will be made about a radio paging receiver according to one embodiment of this invention. The radio paging receiver comprises a data memory 1 for memorizing message data and error indication data to overwrite the message data, a control unit 2 for detecting presence or absence of an error in the message data, overwriting the message data with the error indication data in presence of the error, and transmitting the message data alone or the message data overwritten with the error indication data, a display unit 5 for displaying the message data alone or the message data overwritten with the error indication data, a code programmer 4 as a code program setting unit for setting a program for entering the error indication data in correspondence to code identification in response to an indication request, and an error identification memory 3 formed by an EEPROM for rewritably memorizing the error indication data in correspondence to the code identification.

The control unit 2 preliminarily makes the error identification memory 3 store the error indication data in a manner such that different contents are stored at different addresses, respectively, in correspondence to an ID code for the code identification specified by the program. When a power supply is turned on, the control unit 2 reads the error indication data from the error identification memory 3 and makes the data memory 1 memorize the error indication data.

The data memory 1 comprises a message data memory 1*a* formed by a ROM for preliminarily memorizing the message data for use in error detection, and an error indication data memory 1*b* formed by a RAM memorizing the error indication data.

With the above-mentioned structure, the control unit 2 reads the message data from the message data memory 1*a* upon message display and, in presence of the error as a result of error detection of the message data, reads the error indication data from the error indication data memory 1*b* to overwrite the message data before transmission to the display unit 5. When the power supply is turned on, the control unit 2 reads the error indication data from the error identification memory 3 and makes the error indication data memory 1*b* (RAM) memorize the error indication data.

In the above-mentioned operation of the control unit 2, the content of the error identification memory 3 (EEEPROM) is duplicated into the error indication data memory 1*b* (RAM) when the power supply is turned on. Such duplication is performed in order to increase a data processing speed because the access to the EEPROM is slower than the access to the RAM. The EEPROM is advantageously used because information stored therein is not erased but maintained even in absence of a power supply voltage, for example, during battery exchange.

Thus, the radio paging receiver is characterized by a basic function achieved by the control unit 2, the error identification memory 3*a*, and the code programmer 4. In accordance with the ID code specified by the program set by the code programmer 4, the control unit 2 makes the error identification memory 3 store the error indication data with different contents at different addresses. In addition, when the power supply is turned on, the control unit 2 reads the error indication data from the error identification memory 3 and makes the error indication data memory 1*b* in the data memory 1 memorize the error indication data.

Figure 2:
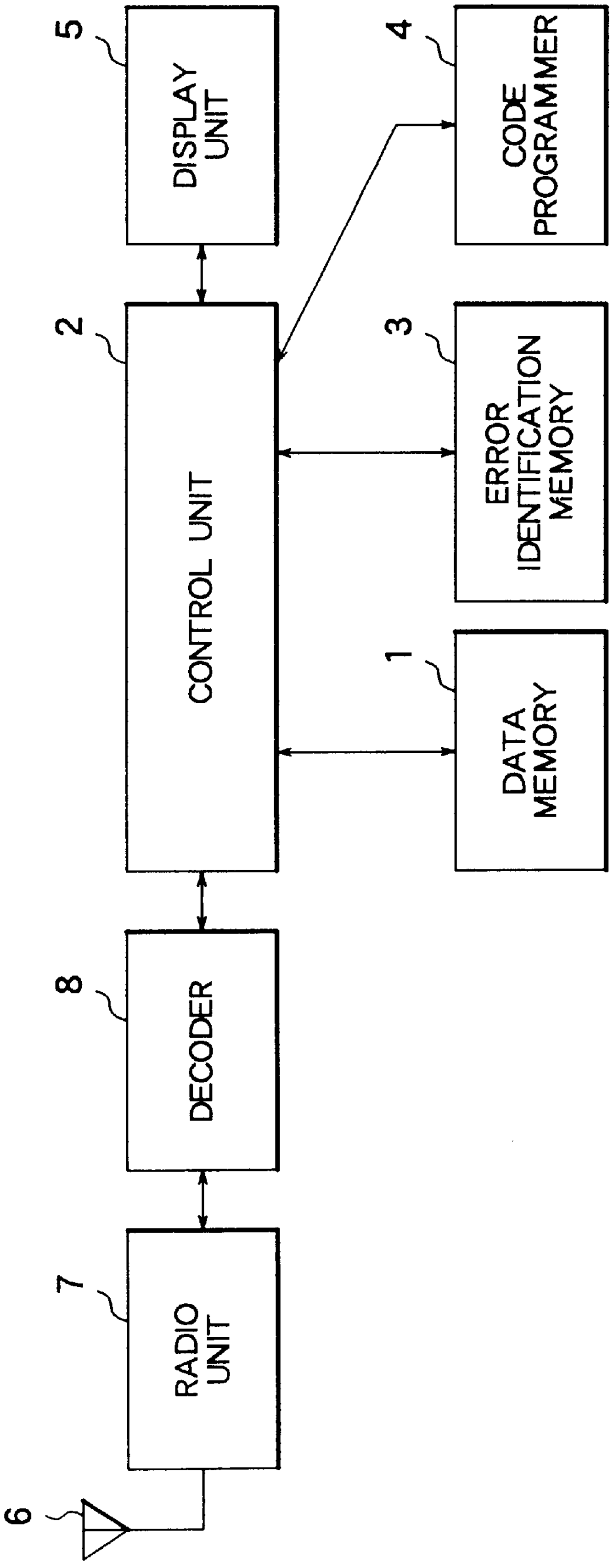
FIG. 2 is a block diagram of a basic structure of the radio paging receiver illustrated in FIG. 1.

Referring to FIG. 2, the radio paging receiver comprises, in addition to the above-mentioned components, an antenna 6 for receiving as a reception signal the external radio communication signal including the message data addressed to the receiver and a radio unit 7 for demodulating the reception signal into the digital signal. A combination of the antenna 6 and the radio unit 7 forms a radio receiving section. The radio paging receiver further comprises a decoder 8 for analyzing the digital signal into word data to detect the address destined to the receiver and delivering to the control unit 2 the address thus detected and the message data following the address.

As described above, the control unit 2 preliminarily makes the error identification memory 3 store the error indication data in a manner such that different contents are stored at different addresses, respectively, in correspondence to the ID code specified by the program. Herein, data corresponding to the ID code specified by the code programmer 4 include frequency data or the like in addition to the address and the error indication data. Therefore, the error identification memory 3 memorizes those data under control of the control unit 2. The decoder 8 analyzes the digital signal into the word data by establishing bit synchronization using a preamble of the digital signal and by establishing word synchronization by detecting a synchronization signal contained in the digital signal. The control unit 2 makes the error indication data memory 1*b* memorize the address destined to the receiver.

In the above-mentioned radio paging receiver, the radio unit 7 demodulates the reception signal received by the antenna 6 into the digital signal. The decoder 8 establishes the bit synchronization by the use of the preamble of the digital signal and establishes the word synchronization by detecting the synchronization signal contained in the digital signal to thereby analyze the digital signal into the word data. The decoder 8 delivers to the control unit 2 the address destined to the receiver, which is detected by the analysis into the word data, and the message data following the address. The control unit 2 makes the error indication data memory 1*b* memorize the address destined to the receiver and reads the message data for error detection preliminarily memorized in the message data memory 1*a* in accordance with the address destined to the receiver. The message data thus read are compared with the message data contained in the digital signal. In presence of the error as a result of comparison, the control unit 2 reads the error indication data corresponding to the address from the error indication data memory 1*b* to overwrite the message data. The control unit 2 delivers to the display unit 5 the message data overwritten with the error indication data. The display unit 5 displays the message data overwritten with the error indication data.

In the above-mentioned radio paging receiver, the error indication data memory 1*b* stores the error indication data of the different contents at the different addresses. The error indication data are preliminarily read from the error identification memory 3 under control of the control unit 2 when the power supply is turned on. Therefore, the error indication data to overwrite the message data in presence of the error have a wide variety adaptable to the indication request. The error indication data stored in the error identification memory 3 are rewritable by the use of the program set in the code programmer 4. It is therefore possible to change the error indication data or to change an error indication content displayed on the display unit 5.

Figure 3:
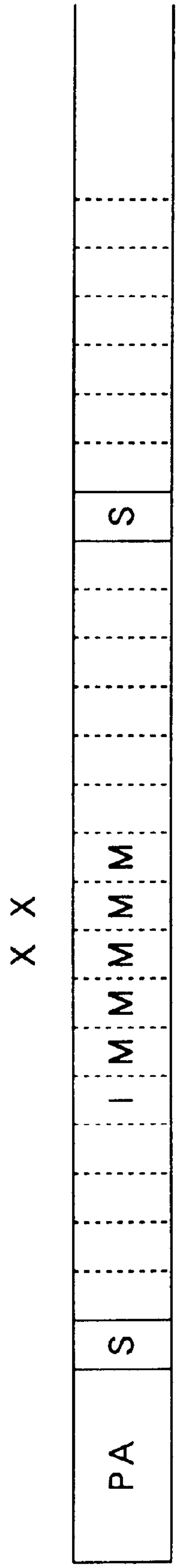
FIG. 3 shows a POCSAG signal as a radio paging signal (reception signal) received by the radio paging receiver illustrated in FIG. 2.

Referring to FIG. 3, the radio paging receiver receives a POCSAG signal as a radio paging signal (reception signal).

The POCSAG signal includes a preamble PA, a synchronization signal S, an address word I, and message words M. In the illustrated example, third and fourth message words M have errors.

Figure 4:
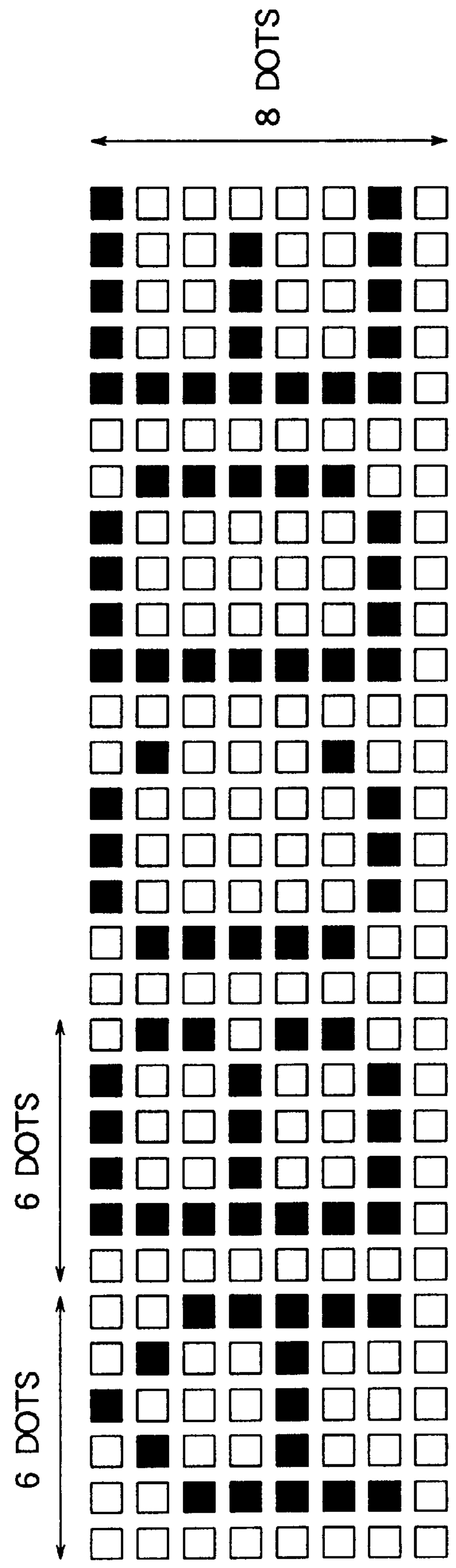
FIG. 4 shows an example of message data of the reception signal in FIG. 3 as displayed in a display section.

It is assumed here that the message data "ABCDE" are received. The message data are displayed at the display unit 5 as illustrated in FIG. 4. Herein, 6×8 dots are used to display each single character. Besides English characters and numerals, the message data can be Chinese kanji characters, Japanese kanji characters, Thai characters, Hindi characters, or the like.

The radio paging receiver may sometimes fail to correctly receive the message depending upon an environment where it is used, like an FM radio set which is sometimes difficult to hear due to noise. In such event, the message data which have not normally been received are overwritten with the error indication data (error message data) to provide special indication recognizable by the possessor of the radio paging receiver.

Figure 5A:
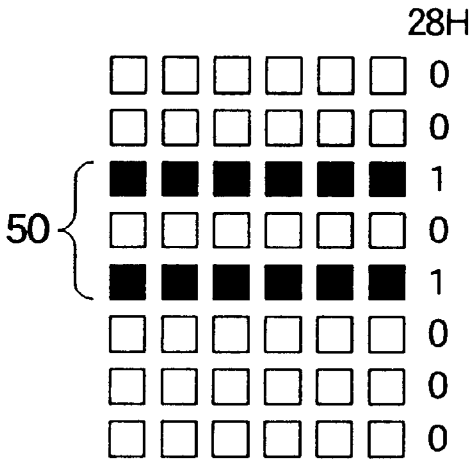
FIG. 5A and 5B show examples of error indication data as displayed in the display section when an error occurs in the message data of the reception signal in FIG. 3.
Figure 5B:
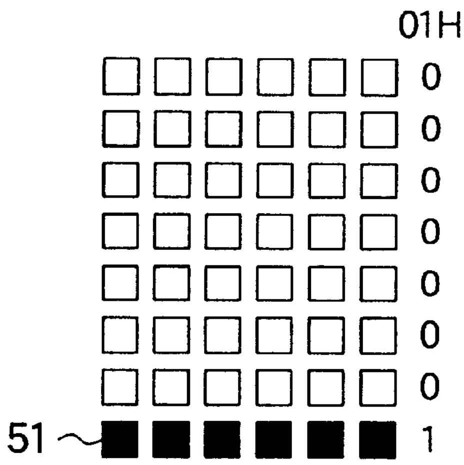

Referring to FIGS. 5A and 5B, the error indication data depicted at 50 and 51 are a double canceling line and an underline, respectively.

When the message data overwritten with the error indication data 50 or 51 are displayed in the display unit 5, the possessor of the receiver can recognize that the error message data are displayed. The error indication data are preliminarily stored in the error identification memory 3 by the use of the program set in the code programmer 4. In the illustrated example, a single row of data (1 byte) are stored, i.e., 28 H and 01 H (in hexadecimal notation) in case of the double canceling line and the underline, respectively. Alternatively, 00 H is set in case of no error indication and FFH is set in case of full black paint. The error indication data may be an error character corresponding to a single character, for example, o and ×. Even no indication can be used. Thus, error indication can be selected as desired.

Figure 6:
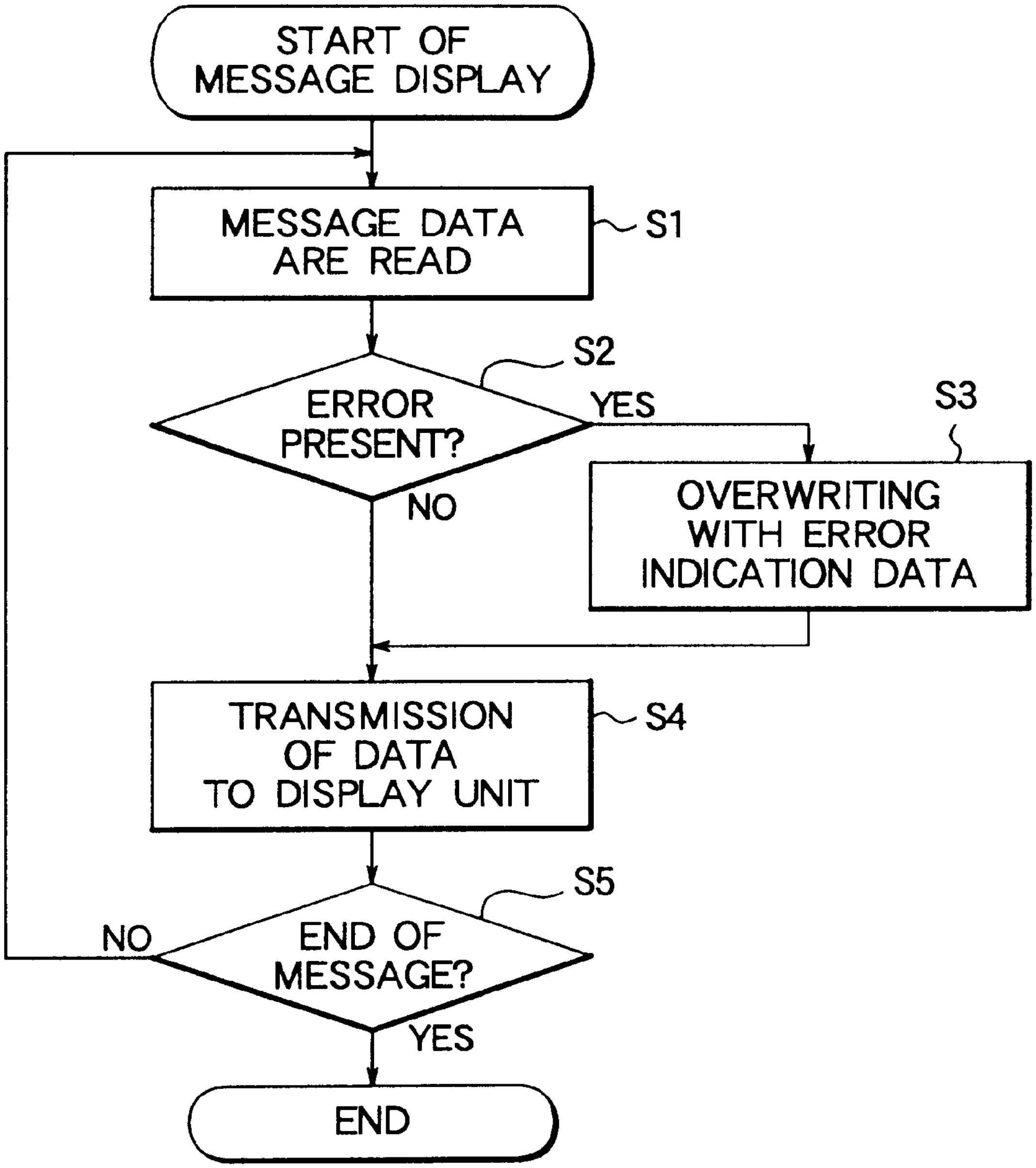
FIG. 6 is a flow chart for describing a message displaying operation of a control section illustrated in FIG. 1 and 2.

Referring to FIG. 6, a message displaying operation of the control unit 2 will be described. When the message displaying operation is started, the message data are read from the message data memory 1*a* (step S1). Judgement is made about whether or not the error is present in the message data (step S2). In presence of the error, the error indication data are read from the error indication data memory 1*b* to overwrite the message data (step S3). Then, the message data overwritten with the error indication data are delivered to the display unit 5 (step S4). In absence of the error, the message data are straightforwardly delivered to the display unit 5 (step S4). Thereafter, judgement is made about whether or not the end of the message is reached (step S5). If the end of the message is reached, the operation comes to an end. Otherwise, the operation returns to the step S1 to repeat the above-mentioned steps until the end of the message is reached.

Figure 7A:
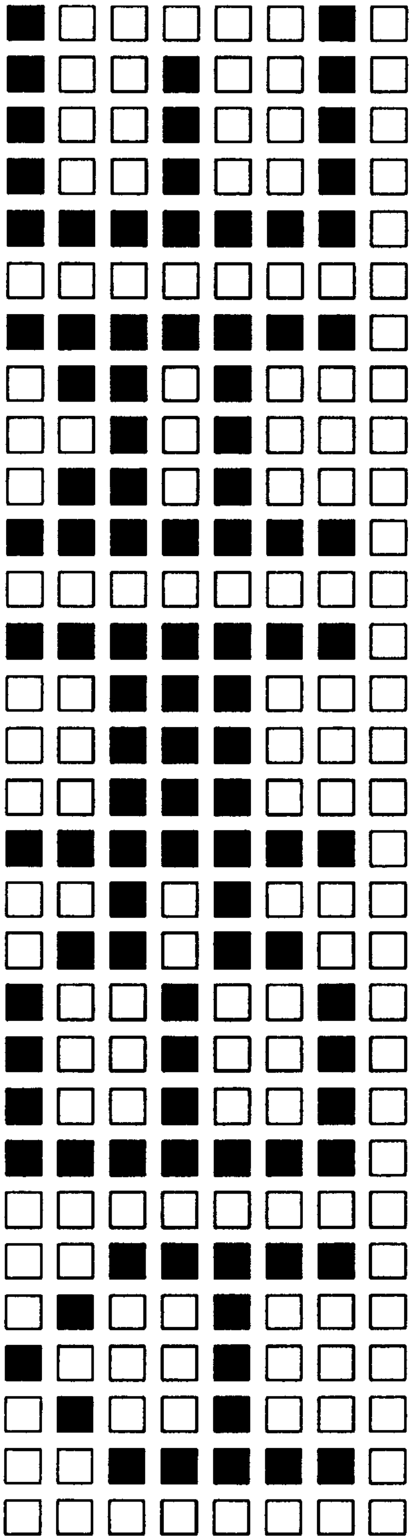
FIGS. 7A and 7B show the message data in FIG. 4 overwritten with the error indication data in FIGS. 5A and 5B, respectively.
Figure 7B:
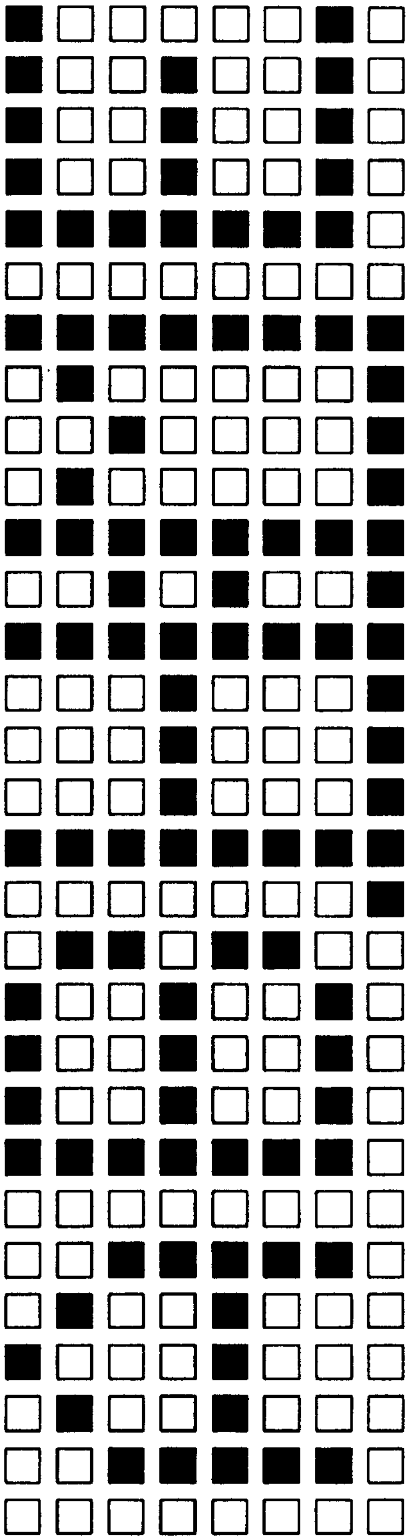

Referring to FIGS. 7A and 7B, the message data "ABCDE" are erroneously received as "ABHME" and overwritten with the error indication data. In FIGS. 7A and 7B, error characters "HM" are overwritten with the error indication data 50 (double canceling line) and 51 (underline), respectively.

In both of FIGS. 7A and 7B, it is apparent that the error characters "HM" are overwritten with the error indication data.

The foregoing embodiment is directed to the case where the program for entering the error indication data to be stored in the error indication memory 3 in accordance with code identification in response to the indication request is set by the code programmer 4. Alternatively, a code program setting arrangement equivalent in function can be implemented by a code program manipulator which is manipulated by a user through a switching operation (menu operation). Although the POCSAG signal is described in the foregoing embodiment, the reception signal may have a different format, for example, a FLEX signal or an ERMES signal.

As described above, the radio paging receiver of the foregoing embodiment comprises, in addition to the structure of the existing receiver, the code programmer 4 as the code program setting section for setting the program for entering the error indication data in accordance with code identification in response to the indication request, and the error identification memory 3 for rewritably memorizing the error indication data in accordance with the code identification. The control unit 2 makes the error identification memory 3 preliminarily memorize the error indication data in a manner such that the different contents are stored at the different addresses, respectively, in correspondence to the ID code for code identification specified by the program. Thus, the error indication displayed by the display unit 5 can be changed and diversified so as to assist the user in handling. In the above-mentioned radio paging receiver, the control unit 2 reads the error indication data from the error identification memory 3 and makes the data memory 1 (the error indication data memory 1*b*) memorize the error indication data when the power supply is turned on. Therefore, data processing upon message display including error indication can be carried out at a high speed. In addition, since the error indication can be modified in the above-mentioned radio paging receiver, it is possible to optimize the error indication in such a paging system supporting multiple languages. Specifically, a desired pattern adapted to an overwriting position can be selected as an error indication pattern irrespective of the form of a character to be displayed with the error indication.

What is claimed is:

1. A radio paging receiver comprising a data memorizing section for memorizing message data and error indication data to overwrite said message data, a control section for detecting presence or absence of an error in said message data, overwriting said message data with said error indication data in presence of the error, and transmitting for message display said message data alone or said message data overwritten with said error indication data, a display section for displaying said message data alone or said message data overwritten with said error indication data, a code program setting section for setting a program for entering said error indication data in correspondence to code identification in response to an indication request, and an error identification memorizing section for rewritably memorizing said error indication data in correspondence to the code identification, said control section making error identification memorizing section preliminarily store said error indication data in correspondence to an ID code for the code identification specified by said program.

2. A radio paging receiver as claimed in clam 1, wherein said control section makes said error identification memorizing section store said error indication data in a manner such that different contents are stored at different addresses, respectively.

3. A radio paging receiver as claimed in claim 2, wherein said control section reads, when a power supply is turned on, said error indication data from said error identification memorizing section and makes said data memorizing section memorize said error indication data.

4. A radio paging receiver as claimed in claim 3, wherein said data memorizing section comprises a message data memory for memorizing said message data for use in error detection, and an error indication data memory for rewritably memorizing said error indication data, said control section reading said message data from said message data memory upon message display and, in presence of the error as a result of error detection of said message data, reading said error indication data from said error indication data memory to overwrite said message data before transmission of said message data for message display.

5. A radio paging receiver as claimed in claim 4, wherein said control section reads, when a power supply is turned on, said error indication data from said error identification memorizing section and makes said error indication data memory memorize said error indication data.

6. A radio paging receiver as claimed in claim 5, further comprising a radio receiving section for receiving an external radio communication signal including said message data addressed to said receiver to demodulate said radio communication signal into a digital signal, and a decoder for analyzing said digital signal into word data to detect an address destined to said receiver and delivering to said control section said address thus detected and said message data following said address.

7. A radio paging receiver as claimed in claim 6, wherein said decoder analyzes said word data by establishing bit synchronization using a preamble of said digital signal and by establishing word synchronization by detecting a synchronization signal contained in said digital signal, said control section making said error indication data memory memorize said address destined to said receiver.

* * * * *

UNITED STATES PATENT AND TRADEMARK OFFICE

CERTIFICATE OF CORRECTION

PATENT NO. : 6,433,669 B1
DATED : August 13, 2002
INVENTOR(S) : Hiroyasu Kuramatsu It is certified that error appears in the above-identified patent and that said Letters Patent is hereby corrected as shown below:

<u>Column 5,</u>
Line 17, delete "(EEEPROM)" and insert -- (EEPROM) --

Signed and Sealed this

Fourth Day of February, 2003

JAMES E. ROGAN
*Director of the United States Patent and Trademark Office*